May 20, 1969  P. J. COSTA  3,445,697
BRUSHLESS DIRECTION AND SPEED SENSING TRANSDUCER
Filed Nov. 9, 1966
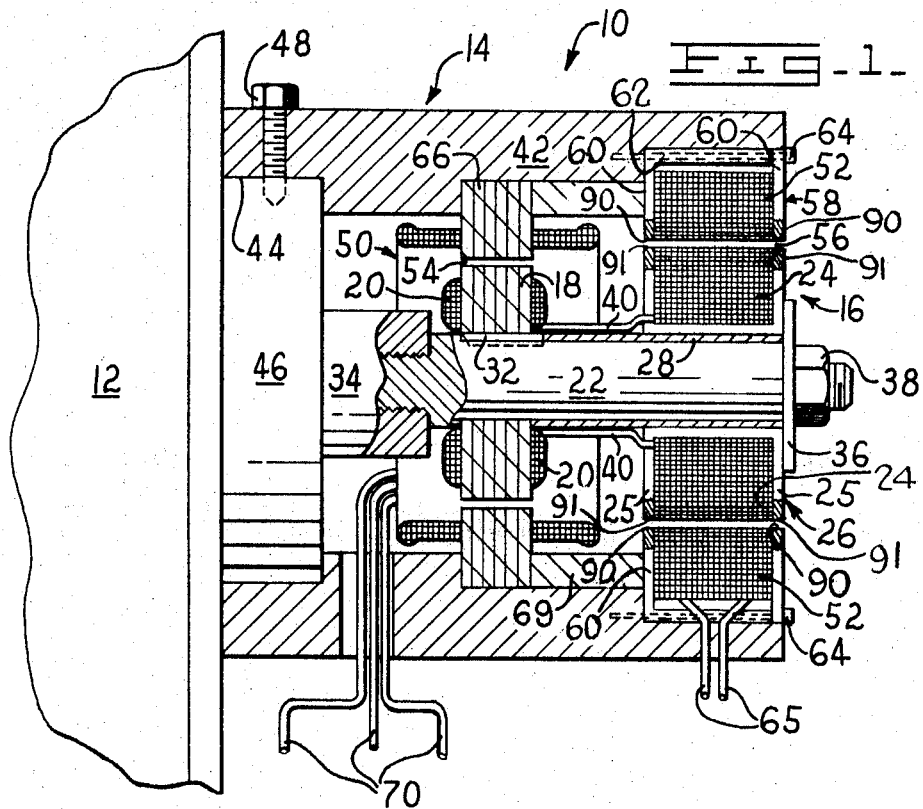
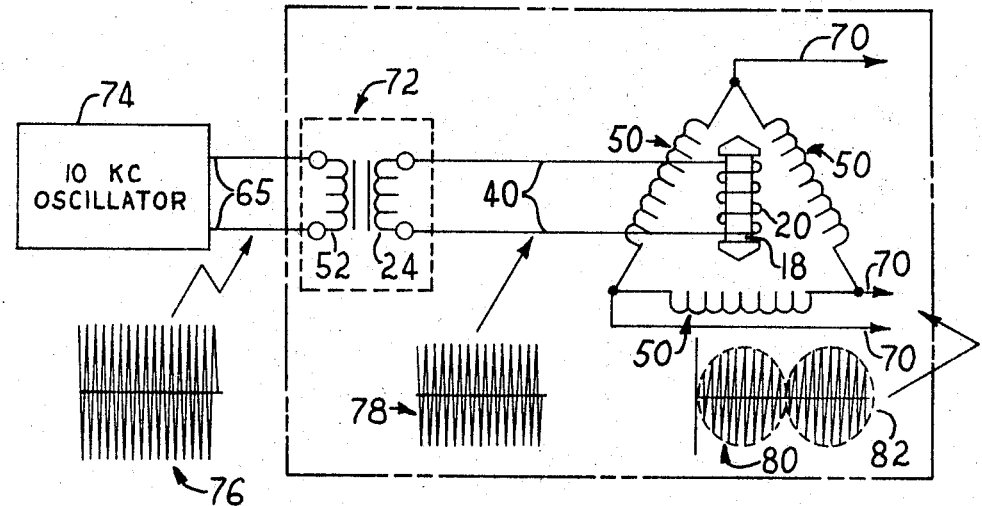
INVENTOR.
PHILIP J. COSTA
BY
ATTORNEYS

United States Patent Office 3,445,697
Patented May 20, 1969

3,445,697
BRUSHLESS DIRECTION AND SPEED
SENSING TRANSDUCER
Philip J. Costa, Chillicothe, Ill., assignor to Caterpillar
Tractor Co., Peoria, Ill., a corporation of Illinois
Filed Nov. 9, 1966, Ser. No. 593,064
Int. Cl. H02k 11/00
U.S. Cl. 310—68                                  3 Claims

ABSTRACT OF THE DISCLOSURE

A brushless, bearingless synchro transmitter with inductively coupled high frequency excitation for detecting the speed and direction of rotation of a prime mover rotor comprising synchro means including a stator winding and rotor winding and inductive coupling means including a primary and secondary winding. The opposing members of each of the above means are maintained in proper register by mounting them respectively upon a stationary housing member secured in fixed relation to the prime mover and upon the shaft for the prime mover rotor.

---

The present invention relates to alternating current (A.C.) electric drive systems, and more particularly to a brushless speed and direction sensing synchro with inductively coupled high frequency excitation, wherein a synchro is integrally couped to a prime mover rotor shaft of each of a vehicle's wheels for precisely detecting the speed and direction of the prime movers and thus of the vehicle wheels. Although the invention is herein described with reference to A.C. drive systems for vehicles, it is to be understood that the concepts of the invention are equally applicable in any apparatus as a tachometer for sensing the speed and direction of rotating members in general.

Typical among A.C. drive systems for vehicles is the system utilizing an A.C. link between a motor-alternator source of three-phase current, and three-phase, converter-motor wheel drive apparatus. The converter in such systems acts as a frequency changer which converts the motor-alternator output to a variable frequency, A.C. voltage which is used to power the drive motors and thus the wheels of the vehicle. Generally, a tachometer, e.g., a synchro transmitter device, is coupled to each drive wheel shaft of the vehicle to continuously sense the operating conditions thereof, and the output from each synchro transmitter is compared with a respective frequency differential in a frequency summing network, whereby the output of the summing network is used to control the drive motor operation, and thus the operation of each wheel.

In electric A.C. vehicle drive systems such as that briefly described supra, the synchro which senses the operation of the drive motors must be highly accurate over all speeds of the prime mover, from zero to maximum speed thereof. Conventional brush-type synchros are unreliable, particularly when used to monitor high motor speeds, due to wear, fatigue and vibration in the brush-to-ring contact area of the synchro, and due to the use of bearings which are normally associated with such devices.

The present invention overcomes the above-noted shortcomings of prior art synchro transmitter devices, by providing a synchro which accurately monitors the speed and position of a prime mover at all times and at all speeds, which utilizes inductively coupled excitation and thereby which requires a minimum of maintenance while being extremely reliable.

Accordingly, it is an object of the invention to provide a relatively trouble-free brushless and bearingless synchro transmitter for accurately sensing the speed and direction of a prime mover at all speeds thereof.

It is another object of the invention to provide a brushless synchro transmitter wherein the housing and rotor components thereof are mounted directly to the housing and shaft, respectively, of the associated prime mover, thereby precluding the need for bearings in the invention synchro. Thus, the operating speed of the synchro is limited only by the mechanical characteristics of the prime mover whose speed is being monitored.

It is still another object of the invention to provide a brushless synchro device whose operation is unaffected by bearing tolerances in the prime mover which in general cause axial movement of the prime mover rotor.

It is yet another object of the invention to provide a brushless and bearingless synchro capable of use as a transmitter in a conventional selsyn system, to effect matching angular displacement or inductive-type positioning of synchro receivers with electrical characteristics like those of its synchro section.

It is a further object of the invention to provide a brushless and bearingless synchro transmitter wherein the phase sequence of the demodulated output of the three-phase synchro winding is indicative of the direction of rotation of the prime mover.

It is another object of the invention to provide a brushless and bearingless synchro transmitter capable of accurately indicating the actual shaft speed of any type of prime mover by monitoring the frequency of the modulated output of the synchro stator when employed in a two-pole synchro configuration.

It is a further object of the invention provide a brushless and bearingless synchro transmitter having a three-phase output winding wherein the frequency of the modulated output thereof accurately represents the rotor frequency and thus can be directly compared and utilized in a frequency summing circuit to provide control of the prime mover speed.

It is still a further object of the invention to provide a brushless and bearingless synchro transmitter which is extremely sensitive to angular displacement of a shaft, wherein a synchro may thus be mounted at either end of the shaft of, for example, a prime mover, and its load to obtain a continuous indication of the prime mover torque.

Other objects and advantages will be apparent from the following description taken in conjunction with the drawing, in which:

FIG. 1 is a sectional view of the synchro transmitter of the invention assembled in operational relationship to an AC traction motor; and FIG. 2 is a schematic diagram of the electrical circuit of the synchro transmitter of FIG. 1.

Referring to FIG. 1, there is shown an embodiment exemplifying a brushless and bearingless synchro transmitter device 10, assembled in operational relationship to an alternating current (AC) traction motor 12, in accordance with the invention. The synchro 10 is formed of two basic units; a stationary stator housing assembly 14 and a rotatable rotor pole assembly 16.

The rotor pole assembly 16 comprises a laminated core 18 about which are wound rotor pole windings 20, with the core 18 mounted securely to one end of a nonmagnetic, preferably stainless steel, extension shaft 22. A secondary winding 24 of the inductive coupling portion of the synchro 10, is wound within radially outwardly extending flanges 25 of a supporting C-shaped inductive coupling member 26, which in turn is fitted about and secured to a nonmagnetic, preferably stainless steel sleeve 28. The sleeve 28 is then fitted over and secured to the extension shaft 22 by means of, for example, a key 32 fitted into a matching slot in the shaft 22 as well as into a slot in the end of the sleeve 28. The key 32 also engages a slot in the inside circumference of the core 18, whereby the core 18, shaft 22, sleeve 28 and secondary winding 24 are integrally secured together to define the rotor pole assembly 16 of previous mention.

The extension shaft 22 is threaded at both ends thereof, and is threadably engaged in an internally threaded axial bore in the end of a rotor shaft 34 of the traction motor 12. The sleeve 28, inductive coupling member 26 and winding 24 are positively secured on extension shaft 22 by means of a lock washer 36, and a nut 38 which threadably engages the threaded outer end of the extension shaft 22. As further described hereinafter, the rotor pole windings 20 are electrically connected to the secondary winding 24 by conductors 40. As may be seen from FIG. 1, the rotatable rotor assembly 16 is supported entirely by the shaft 34 of the traction motor 12, and thus requires no bearing support.

Regarding now the stator housing assembly 14 of previous mention, there is provided a supporting cylindrical housing 42 which is counterbored within a mounting end thereof, as at 44, whereby the housing 42 fits circumjacently over the machined outer circumference of a bearing housing 46 of the motor 12. The housing 42 is formed of nonmagnetic material, such as for example, aluminum, and is held in place on the bearing housing 46 by one or more radially extending set screws 48.

A three-phase, synchro, output or stator winding 50 and a primary or input winding 52 of the inductive coupling, are integrally retained within the synchro housing 42 and thus remain stationary. Radial and axial alignment of the synchro components is accordingly allowed through the unique configuration of the synchro which requires no bearings, and the assembly procedure thereof, to provide selected air gaps 54 and 56 between the associated components of the rotor and stator assemblies 16 and 14, respectively. The use of nonmagnetic materials in the synchro housing 42, the sleeve 28 and the extension shaft 22, reduces the magnetic flux leakage and tends to confine the magnetic paths for the inductive coupling (windings 24, 52) and the synchro section (windings 20, 50) sufficiently for optimum operation of the synchro 10.

The primary winding 52 of the inductive coupling is wound within a supporting C-shaped inductive coupling member 58, wherein the flanges 60 thereof extend radially inwardly. The member 58 fits within a counterbored portion 62 of housing 42 opposite the mounting end thereof. The member 58 and winding 52 are secured to the housing 42 as by means of a plurality of bolts 64 disposed about the periphery thereof. The peripheral edges 90 of member 58 are in confronting relation to the peripheral edges 91 of member 26, and define therebetween the annular air gap 56. Conductors 65 are connected to the primary winding 52 and extend therefrom through an aperture in the housing 42, and provide external connections for supplying the excitation signal to the winding 52.

The three-phase synchro output or stator winding 50 is mounted on a laminated core 66 which is fitted within a counterbore 68 in the housing 42. The core 66 and thus winding 50 are held in axial alignment, radially opposite the core 18 and windings 20 by means of the spacer sleeve 69 fitted between core 66 and the inductive coupling member 58, with the confronting circumferential surfaces of the cores 18 and 66 spaced apart to form the annular air gap 54. Conductors 70 extend from the windings 50 and through an aperture in the housing 42 to provide electrical connections to the associated external control apparatus of the AC drive system, for introduction thereto of the amplitude modulated signal representative of the speed of the traction motor 12.

Referring now to FIG. 2 in conjunction with FIG. 1, there is shown in schematic form the brushless synchro transmitter 10, wherein the inductive coupling for synchro excitation is indicated by the components within the dashed lines at 72. As previously mentioned the inductive coupling is formed of the primary winding 52 and the C-shaped inductive member 58 which are stationary, in combination with the secondary winding 24 and the C-shaped inductive member 26 which are secured to the nonmagnetic extension shaft 22 of the traction motor 12 and thus are rotatable. The primary 52 is excited via the conductor 65 by an input voltage of, for example, 8 to 10 kilocycles (kc.) as indicated herein by the 10 kc. oscillator 74, to thereby provide the high frequency excitation signal.

The rotor pole core and windings 18, 20, respectively, shown herein by way of example only as a two-pole member, mount on the extension shaft 22 as an integral unit with the secondary winding 24 as described in FIG. 1, whereby both rotate simultaneously with the traction motor shaft 34. The rotor pole windings 20 rotate within the three-phase stator windings 50 which are wound in conventional three-phase configuration and are held stationary in the synchro housing 42. Conductors 70 are connected to the junctions of the windings 50 to provide the amplitude modulated signal to the external control apparatus (not shown).

In operation, the stationary primary winding 52 is excited by the output of the oscillator 74 with a relatively high frequency AC signal as indicated by waveform 76, and through inductive coupling causes a voltage to be induced in the rotatable secondary winding 24 as depicted by waveform 78. Winding 24 is in turn electrically connected to the rotor pole windings 20 via conductors 40. With the synchro rotor pole assembly 16 at rest, a voltage is induced in the three-phase windings 50 of the stator housing assembly 14. The frequency of the stator winding voltages will be the carrier frequency, which in this embodiment is chosen as 10 kc., and the phase voltage amplitudes will be determined by the physical alignment of the rotor assembly 16 with respect to the stator housing assembly 14. This feature makes the synchro 10 useful for the transmission of angular displacement signals, which are determined by sensing the phase voltage amplitudes generated.

When the traction motor shaft 34 is rotating, and hence the rotor pole assembly 16 is rotating, the output of the stator windings 50 is a three-phase amplitude modulated signal on the 10 kc. carrier frequency provided by oscillator 74, as shown by waveform 80. The frequency of the modulation envelope 82 is thus an indication of the speed of the shafts 34, 22. With a two-pole synchro as shown, the output defines one cycle for each complete rotation of the shaft 22. With a four-pole synchro, two cycles of modulated signal would be present at the output, and a six-pole synchro would result in three cycles of modulated signal for each complete shaft rotation. The phase sequence of the output of the three-phase synchro stator windings 50 can be detected by conventional phase sensing circuitry (not shown) and indicates the direction of rotation of the traction motor 12 regardless of whether the synchro 10 is of two, four or six pole design. Generally the synchro 10 is designed with the same number of rotor poles as the motor whose rotor frequency is being monitored.

I claim:

1. A brushless bearingless synchro transmitter with inductively coupled high frequency excitation, for detecting the speed and direction of rotation of a prime mover rotor, the combination comprising:

a stationary synchro housing member secured in fixed relation to the prime mover;

synchro means including a three-phase stator winding wound upon a first core member and integrally disposed within said housing member, and a rotor winding wound upon a second core member, the second core member being supported by the prime mover rotor for rotation of the rotor winding circumjacently within and in register with the stator winding;

inductive coupling means having a primary and secondary winding disposed within said housing member;

said primary winding being wound upon a first supporting inductive coupling member and secured to the housing member, said secondary winding being wound upon a second supporting inductive coupling member supported by the prime mover rotor, the second coupling member supporting the secondary winding for register within said primary winding and for rotation as a unit with the rotor winding, to define thereby an integral synchro rotor assembly supported and rotated within the synchro housing member by the prime mover rotor shaft;

said secondary winding being electrically connected to the rotor winding; and terminal means connected to said primary winding and said stator winding to introduce said high frequency excitation to said synchro transmitter and to provide an output signal from said synchro transmitter respectively.

2. The synchro transmitter of claim 1 wherein said integral synchro rotor assembly is secured to a shaft extending axially from the prime mover rotor, said extension shaft extending coaxially through the center of the housing member and the second inductive coupling and core members are disposed in register within the first inductive coupling and core members respectively to define respective annular air gaps between respective pairs of confronting members.

3. The synchro transmitter of claim 2 wherein said first and second inductive coupling members are annular members having C-shaped cross sections defining cavities for receiving therewithin said primary winding and said secondary winding respectively, wherein the outer peripheral edges of said second C-shaped inductive coupling member lies concentrically within and in confronting relation to the inner peripheral edges of the first C-shaped inductive coupling member to define therebetween said annular air gap and thus said inductive coupling.

References Cited

UNITED STATES PATENTS

| | | | |
|---|---|---|---|
| 2,634,379 | 4/1953 | Brainard | 310—67 |
| 1,983,896 | 12/1934 | Bottcher | 310—112 |
| 2,652,507 | 9/1953 | Kalikow | 310—112 |
| 2,671,180 | 3/1954 | Goldberg | 310—113 |
| 2,832,907 | 4/1958 | McConnell | 310—68 |
| 3,010,040 | 11/1961 | Braun | 310—112 |
| 3,114,094 | 12/1963 | Lee | 310—68 |
| 3,177,387 | 4/1965 | Leischner | 310—112 |
| 3,227,941 | 1/1966 | Collamore | 310—68 |
| 3,237,034 | 2/1966 | Krasnow | 310—156 |
| 3,239,701 | 3/1966 | Campbell | 310—112 |
| 3,246,184 | 4/1966 | Rozmus | 310—68 |

J D MILLER, *Primary Examiner.*

U.S. Cl. X.R.

310—67, 112, 113, 114; 324—70